US007416116B2

(12) United States Patent
Sardano

(10) Patent No.: US 7,416,116 B2
(45) Date of Patent: Aug. 26, 2008

(54) PRINTED USER ACTIVITY AT DIGITAL COPIER OR NETWORK-CONNECTED DEVICE FOR PAY-FOR-PRINT/COPY CUSTOMERS

(75) Inventor: Peter A Sardano, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 425 days.

(21) Appl. No.: 11/221,834

(22) Filed: Sep. 9, 2005

(65) Prior Publication Data

US 2006/0243795 A1 Nov. 2, 2006

Related U.S. Application Data

(60) Provisional application No. 60/675,101, filed on Apr. 27, 2005.

(51) Int. Cl.
*G06K 5/00* (2006.01)

(52) U.S. Cl. ....................................... 235/380; 235/486

(58) Field of Classification Search ................. 235/382, 235/380, 381, 383, 492, 493, 486, 487; 705/52, 705/35, 34, 32, 14, 1

See application file for complete search history.

(56) References Cited

U.S. PATENT DOCUMENTS

| | | | | |
|---|---|---|---|---|
| 5,146,344 | A | 9/1992 | Bennett et al. | |
| 5,383,129 | A | 1/1995 | Farrell | |
| 5,628,004 | A * | 5/1997 | Gormley et al. | 707/104.1 |
| 5,659,845 | A | 8/1997 | Krist et al. | |
| 5,694,528 | A | 12/1997 | Hube | |
| 5,806,057 | A * | 9/1998 | Gormley et al. | 707/1 |
| 5,956,698 | A | 9/1999 | Lacheze et al. | |
| 6,035,281 | A * | 3/2000 | Crosskey et al. | 705/14 |
| 7,020,628 | B2 * | 3/2006 | Peterson et al. | 705/32 |
| 7,120,692 | B2 * | 10/2006 | Hesselink et al. | 709/225 |
| 7,181,421 | B2 * | 2/2007 | Peterson et al. | 705/32 |
| 2002/0103760 | A1 * | 8/2002 | Tianen et al. | 705/52 |
| 2003/0225641 | A1 * | 12/2003 | Gritzmacher et al. | 705/34 |
| 2006/0059057 | A1 * | 3/2006 | Peterson et al. | 705/32 |
| 2007/0265972 | A1 * | 11/2007 | Tsutsui | 705/52 |

* cited by examiner

*Primary Examiner*—Thien M Le
(74) *Attorney, Agent, or Firm*—Oliff & Berridge, PLC

(57) ABSTRACT

A pay-for-use office machine, such as a digital copier, monitors and logs chargeable machine activities on a dynamically changeable session basis and generates a session activity report based on the logged activities during the session. The report enables capture of revenue value from an office machine by a pay-for-use service provider by summarizing activities so that costs associated with the activities can be assessed to the customer at a point-of-sale (POS) terminal. The report may be generated in hardcopy form by the office machine or may be transferred to the POS terminal electronically. The session activity report may include variable costing information for each chargeable activity.

12 Claims, 5 Drawing Sheets

PRINTED USER ACTIVITY AT DIGITAL COPIER OR NETWORK-CONNECTED DEVICE FOR PAY-FOR-PRINT/COPY CUSTOMERS

This nonprovisional application claims the benefit of U.S. Provisional Application No. 60/675,101, filed Apr. 27, 2005.

BACKGROUND

The disclosure relates to tracking and reporting of pay-for-use office machine usage, such as a print/copy machine. More particularly, an internally generated machine usage activity log is provided as a report for individual users of a pay-for-use office machine for services to enable accurate tracking and billing of customer usage on a session basis.

Internal auditrons on many print/copy machines are capable of tracking machine usage on a machine or customer account basis. However, currently there is no provision within a print/copy machine, such as a digital copier or multifunction device, to generate a usage report for the user's activity when the copier is used as a pay-for-print/copy machine by customers to track and report on individual customer's usage for payment purposes. Known payment processes for pay-for-use office machines such as a print/copy machine include a manual entry process completed by a user on a pre-printed form. Additional known solutions include association of a separate activation device, such as a card reader (for debit, credit or pre-paid account cards) or a coin machine, to enable activation of the machine for a predetermined number of copy/print service activities by pre-paid funding.

There are many problems with the currently implemented systems to enable pay-for-print/copy machine usage and billing. The need for a separate activation device for each machine adds cost and complexity to each copy/print machine. It also adds to the potential downtime of the machine due to malfunction of the activation device. Additionally, when more than simple copying is involved, there is a need for complex printer/copier interaction with the activation device to allow for different levels of service pricing.

There are also problems with a manually entered customer reporting system. Foremost, there is a large potential for underreporting of copy services actually completed. Additionally, there is a large potential for inaccurate or incomplete manual entry of the customer's activities, particularly when many different services can be obtained. Because of these deficiencies, large losses of revenue are to be expected by businesses providing self-service pay-for-print/copy services.

SUMMARY

There is a need for an improved reporting system and method that can enable capture of revenue value from an office machine, such as a print/copy machine, to a pay-for-use service provider.

There also is a need for an activity monitor to generate automatically or in response to customer input a report of machine usage by a customer on a dynamically variable session basis so as to provide a customer with a record of the transaction. It is preferable to have such monitoring and tracking occur internally within the machine itself to minimize cost and complexity.

In accordance with exemplary embodiments, an internally generated report from the machine reflects machine usage activity, on an individual session basis, and accurately accounts for various office machine functions or activities, such as copies made, paper size, paper type, paper color, simplex or duplex, color or monochrome, hole punch, staples, and other features or functions a pay-for-print print/copy machine can provide to an individual customer on a per-feature charge basis.

In accordance with a preferred exemplary embodiment, upon completion of a customer session, the report is printed by the print/copy machine in hardcopy form to the customer. The customer then merely has to present the report to a cashier or point of sale (POS) terminal for payment purposes. Alternatively, the report may be forwarded to a remote point of sale (POS) device or terminal to enable machine activity associated with a particular user session to be properly accounted for billing and payment purposes.

In accordance with exemplary embodiments, the print/copy machine may perform one or more office equipment functions, including copy, print, scan, fax, scan-to-email, or scan-to-X destination functions.

In accordance with a preferred embodiment, the print/copy machine is a digital copier.

In accordance with exemplary embodiments, the machine is placed in a customer use mode that allows for monitoring of machine activity on an individual customer session basis. Such a mode would typically not be a mode shipped from the factory as a default setting, but a mode configured, for example, through a System Administrator or Key Operator setting that is password protected or otherwise protected from override by the typical machine customer. Upon initiation, all machine activities associated with a usage charge for the customer (end user) can be monitored by the machine and retained in device memory, such as through appropriate job attribute counts and usage compiled by appropriate sensors and counters. Upon completion of a customer session, the record of the individual session activity can be generated internally by the print/copy machine and provided to the customer, such as in printed hard copy form for presentation to a pay-for-use service provider or point-of-sale (POS) terminal for payment. The presentation may be in the form of a billing statement or invoice.

In various embodiments, the session activity report may include a summary of chargeable machine activity. In certain embodiments, the report may include costing information in addition to usage.

If the customer machine is network enabled, the individual user activity report can be transmitted via the network to a customer point of sale (POS) terminal to enable presentation of machine activities to a cashier for determination of usage costs and payment purposes. This information could be displayed automatically to match a printed activity report presented by the user for payment. Matching could occur, for example, through a randomly generated customer identifier that is printed on the hardcopy printed activity report and provided to the POS terminal.

In accordance with exemplary embodiments, the report can include additional information, such as marketing information. Non-limiting examples include marketing messages, in-store coupons, company logos or UPC symbols, etc. that can be scanned at the point of sale or visually read by the customer. This can increase the overall benefit of the activity report by using the monitoring report beyond a usage tally.

In certain embodiments, the office machine may be able to compile individual session activity reports into other report forms, such as an overall machine usage report, daily usage report. Additionally, the office machine may send the session activity reports to a remote centralized facility for compilation of additional reports, such as collective reports on a site location basis.

BRIEF DESCRIPTION OF THE DRAWINGS

Exemplary embodiments will be described with reference to the drawings, wherein.

DETAILED DESCRIPTION OF EMBODIMENTS

Figure 1:
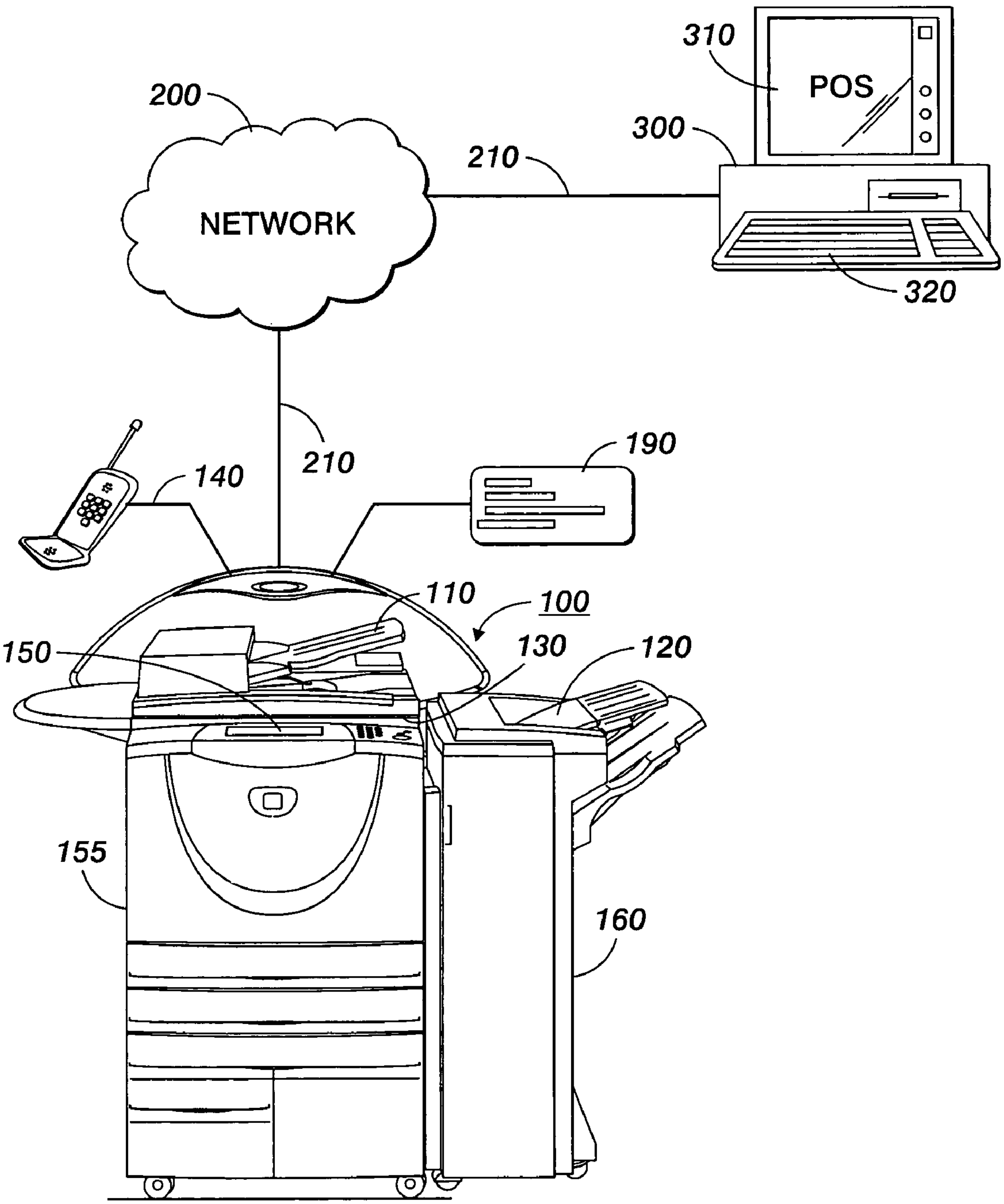
FIG. 1 illustrates an exemplary pay-for-use office machine in the form of a print/copy machine accessible by customers for usage.

In FIG. 1, an exemplary office machine 100 is provided. Machine 100 performs one or more known office equipment device functions, such as copy, scan and print. However, machine 100 can have additional or other functionality, such as the ability to capture or upload digital files, store electronic files, fax, scan-to-email, or scan-to-X destinations, such as a data repository.

In this particular embodiment, office machine 100 is a digital copier or multifunctional device, such as a multifunction copier, facsimile and scanner. Non-limiting examples include the DocuCentre DC5xx series and WorkCentre 55 series copiers available from Xerox Corporation. Office machine 100 is also applicable to an image print system as described in U.S. Pat. No. 5,694,528 to Hube and U.S. Pat. No. 5,956,698 to Lacheze et al., both assigned to Xerox Corporation and hereby incorporated herein by reference in their entireties.

Exemplary office machine 100 in the form of a print/copy machine includes input tray 110, output tray 120, scanning platen 130, user interface 150 including a display panel and keypad/touchscreen, print engine 155, and an optional finishing unit 160. In certain embodiments, print/copy machine 100 is a standalone machine that provides pay-for-print/copy services to a customer. In other embodiments, print/copy machine 100 may be integrated into a system that includes at least one point-of-sale (POS) terminal 300. Communication with terminal 300 may be through suitable connection links. The connection may be part of a network 200 through network interface connection links 210, or the connection may be to remote devices, systems and networks through a telephone interface 140. Print/copy machine 100 communicates through the network using conventional network protocols. In various embodiments, machine 100 may also be connected to an electronic input device 190, such as memory card reader, CD-ROM or DVD drive, USB port-enabled device, etc.

A point of sale (POS) terminal 300 is associated with one or more office machines such as print/copy machine 100 and used to process payment for services. Preferably, POS terminal 300 is in the vicinity of one or more copy/print machines 100 at a commercial pay-for-use provider facility. POS terminal 300 can include an appropriate display 310 and keypad 320 as known in the art. When the machine 100 is a standalone machine, terminal 300 is preferably located on-site at the premises of the pay-for-print/copy service provider in proximity to machine 100. Alternatively, when the machine 100 is network-enabled, POS terminal 300 can be located anywhere in communication with the network. However, again, as in the standalone context, it is preferable that the POS terminal 300 be located in proximity to the machine 100, preferably on-site at the pay-for-print/copy service provider premises to facilitate payment.

User interface 150 enables a customer to customize a print job by selection of various copy, print or scan functions and features as known in the art. Examples include selection of number of copies, paper size, paper type, simplex or duplex, color or monochrome, magnification, etc. User interface 150 can also enable customized output features. These can include various finishing features from finishing unit 160 such as collating, stapling, binding, etc. One of ordinary skill in the art will appreciate that any known or subsequently developed feature can be included to customize the print/copy request.

Figure 2:
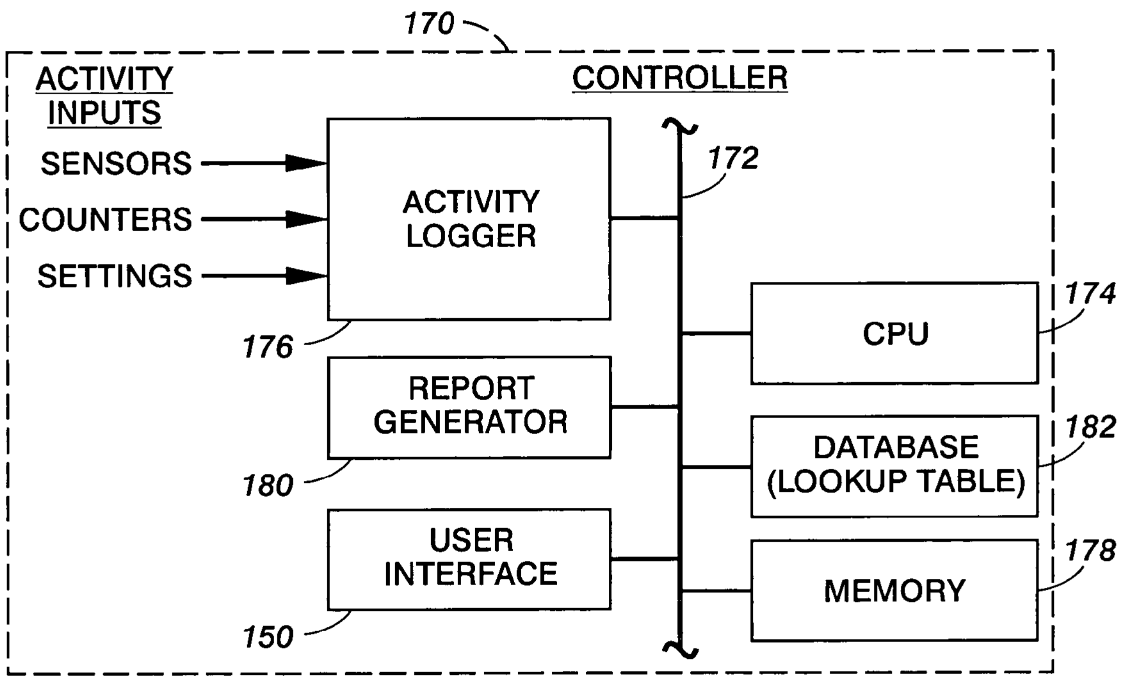
FIG. 2 illustrates an exemplary schematic of a machine controller within the machine of FIG. 1.

With reference to FIG. 2, machine 100 includes a controller section 170 that controls various machine operations. In particular, controller 170 may include a bus 172. Various machine operations are controlled by a CPU 174. In particular, various sensors, operation counters and setting values are set and monitored by the machine. These can include paper or copy counters for each of several paper stock trays or sheet stock sizes, duplex or simplex copy, color or monochrome printing, finishing settings, etc. Each of these activity inputs can be monitored and logged by an activity logger 176, which can store various activities in static or dynamic memory 178.

During a customer print session, various copies, prints, scans or other functions are performed by machine 100. During such activities, activity logger 176 keeps a total usage of functionality for the customer. Upon completion of a customer session, report generator 180 compiles a user activity report based on the data stored by activity logger 176 and optional pricing scheme data from database 182. The report provides a useful summary of the activities engaged by the customer and information useful to prepare accurate billing based on actual customer usage. Report generator 180 can be implemented in hardware or software. Exemplary reports include both a summary of activities and optionally a computed monetary amount for the use of the machine. The actual form of the report can take various forms and may include textual, graphic or other information. Preferably, the information identifies the customer and session by a unique identifier. Examples include a randomly or sequentially generated value, or the customer identity and date/time stamp for the session transaction.

Various pricing schemes may be associated with each machine function when the print/copy machine is used as a pay-for-print/copy device. In its simplest form, each function having a potential pricing scheme is separately monitored and tabulated for compilation and inclusion in a session activity report with usage information only. In this example, pricing scheme information for each activity may be programmed and stored or associated with the POS terminal 300 for lookup when the customer presents the session activity report for payment. For example, simplex B&W copying on standard 8½×11' paper may be $0.10 per copy. Color copies in simplex may have a higher charge, such as $0.30 per copy. Use of different sheet stock or different sizing may incur a different per copy charge. Additionally, optional features, such as finishing options (stapling, binding, cover sheets, etc) may incur separate expense. Any of these customizable features may have associate cost indices and may have bulk rate discounts for higher print production quantities, such as $0.09 per copy for copies in excess of 100. Completion of the transaction would involve correlating each chargeable activity tabulation contained in the session activity report with an associated price to derive cost information for the session.

Alternatively, in certain embodiments, machine 100 itself may include a database 182 or lookup table, preferably in a changeable form such as in RAM or EPROM memory, containing pricing information for each chargeable machine activity. This database 182 or lookup table may be referenced during session activity report generation to include costing information for the session on the report itself.

Figure 3:
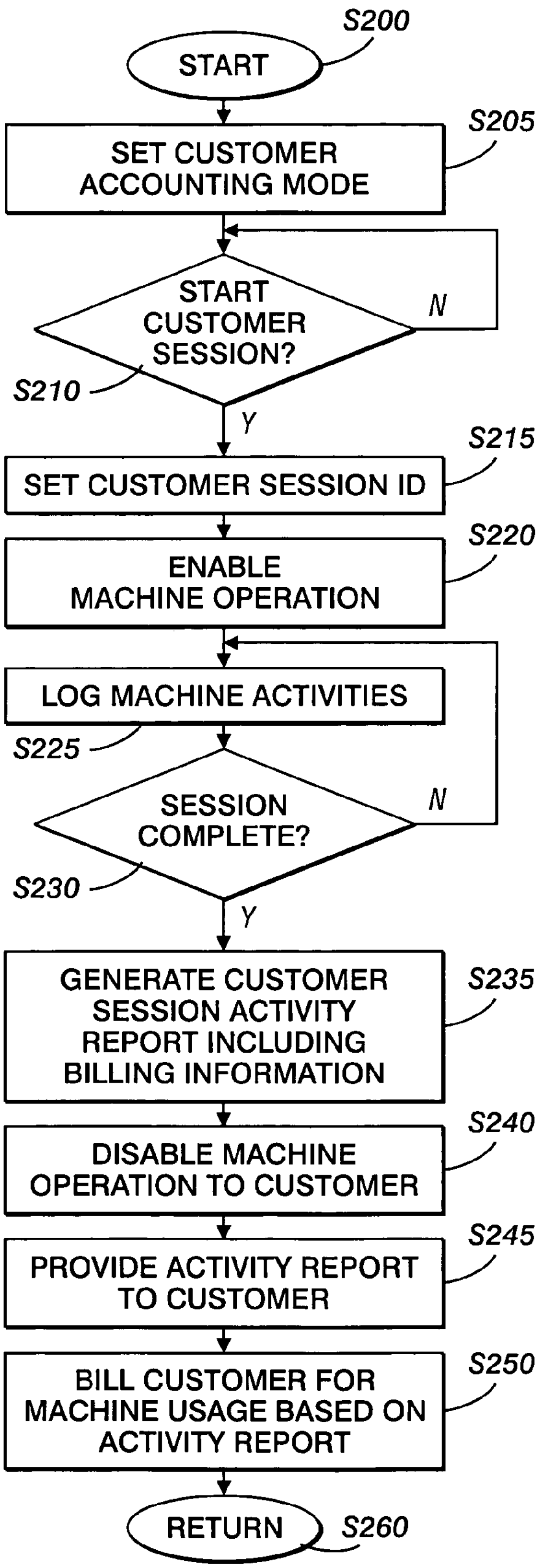
FIG. 3 illustrates an exemplary flow chart showing customer operation of the machine of FIG. 1 and generation of a customer session activity report for billing purposes.

A method of machine operation will be described with reference to FIG. 3. The process starts at step S200. From step S200, flow advances to step S210 where a special pay-for-print customer accounting mode is entered. This mode allows for monitoring of machine activity on an individual customer session basis. Such a mode would typically not be a mode shipped from the factory as a default setting, but a mode configured, for example, through a System Administrator or Key Operator setting that is password protected or otherwise protected from override by the typical machine customer. Upon initiation, flow advances to step S210 where the system waits for a customer session to start. Upon starting of a job, such as by customer input requesting performance of a machine activity, a customer session ID is created for the current session. This is preferably an unique or otherwise distinguishable ID, such as a transaction number or customer name and clock date stamp.

Once a session has been initiated, flow advances to step S220 where machine operation is enabled. During this time, a customer is able to perform various machine functions by selection using user interface 150. All machine activities associated with a usage charge for the customer (end user) can be monitored and retained in device memory at step S225. This can be achieved through appropriate job attribute counts and usage information compiled by appropriate sensors and counters within the machine 100 itself. Upon completion of a customer session at step S230, a customer session activity report is automatically generated using report generator 180. Completion may be determined by customer response to a dialog prompt, such as "Continue Session? Y/N." If "Y" is input, the session is ended. If "N" is input, the machine 100 is placed in a ready mode again where job activity can be continued.

Because the report is generated within machine 100 itself, there is no need for interaction with remote monitoring or status devices and associated costs or complexities. The report can take various forms. However, the report should include a summary of the customer activity during the session with sufficient information to enable billing for the usage at POS terminal 300.

From step S235, flow advances to step S240 where machine 100 is disabled for further operation by the customer, at least until payment is made for the completed session or until a new session has been initiated. From step S240, flow advances to step S245 where the activity report is provided to the customer. In a preferred embodiment, this is achieved by generating an electronic image of report and sending this image to the printing section of machine 100 to output a hardcopy of the report for the customer. This hardcopy report is then taken to a cashier or POS terminal 300 manually at the site of the pay-for-print/copy service provider where the customer is billed for usage based on the session activity report (Step S250). In the case of a networked machine, the session activity report could be transmitted to the POS terminal 300 to display the session activity associated with the customer's machine usage activity (step S250). This information could be used directly for payment. Alternatively, this electronic form could be displayed for comparison matching with the hardcopy presented by the customer for billing. The process then ends at step S260.

Figure 4:
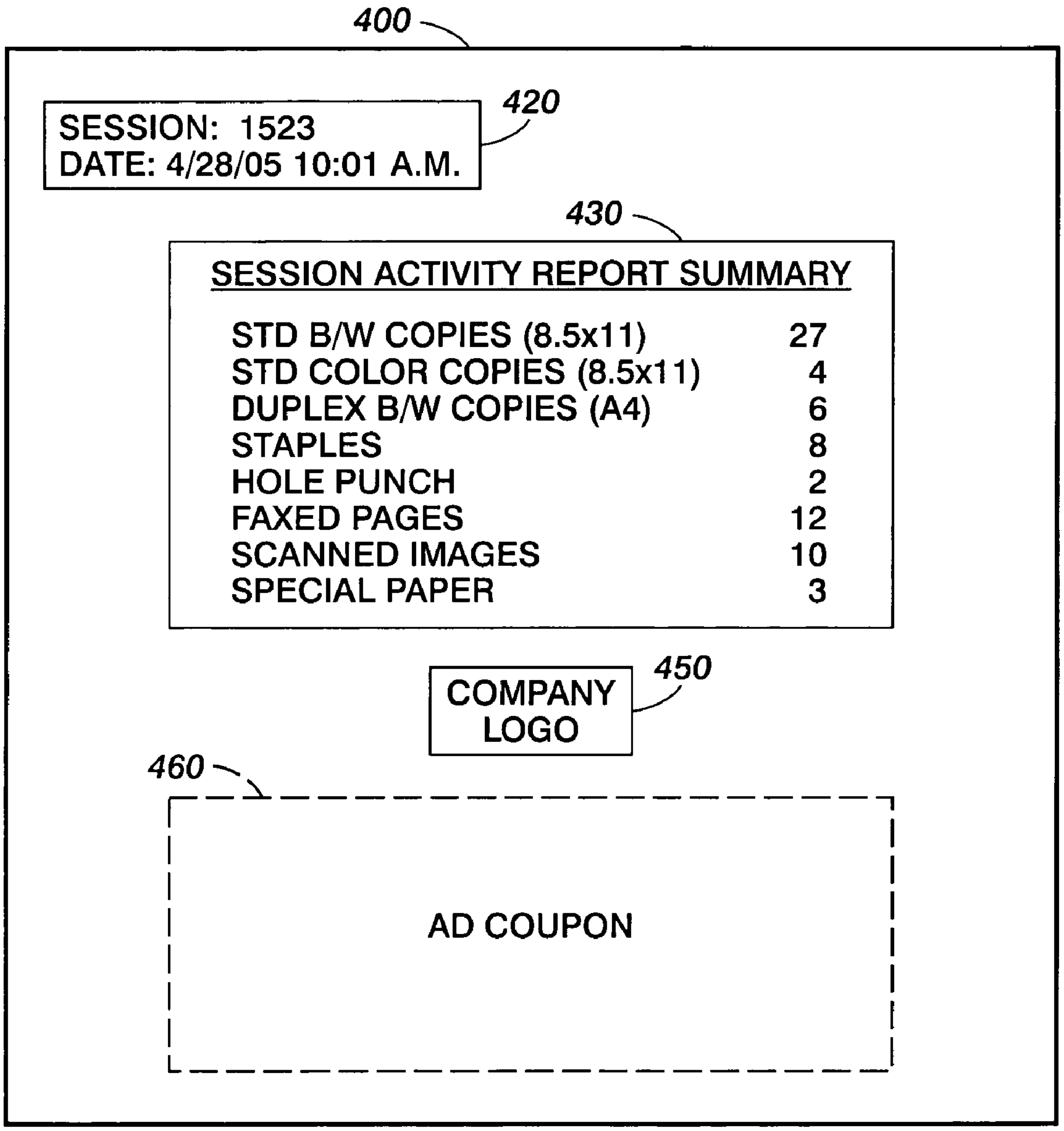
FIG. 4 illustrates an exemplary pay-for-use session activity report.

An exemplary session activity report 400 is shown in FIG. 4. Report 400 includes a unique session ID tag 420, which can take many forms. One suitable example is a sequential session number coupled with a date/time stamp as shown. The ID tag 420 can also be randomly generated. Report 400 also includes a session summary 430 that describes or documents various chargeable machine activities performed during the session. In the example shown, various used functions are illustrated along with a usage tabulation. Copies may be subdivided into various categories that may be associated with different pricing schemes, such as b/w or color copies, simplex or duplex copies, size or finishing options.

In addition to providing pure usage activity or billing on the report, the report can contain additional information or advertising. For example, memory within machine 100 can include images that could be printed with the report. These could contain marketing messages, in-store coupons, company logos or UPC symbols that can be scanned at the point of sale. Such additional report usage can increase the overall benefit of the activity report by providing useful information to the customer. FIG. 4 shows non-limiting examples of this additional information, including a company logo 450 and an ad coupon 460.

Figure 5:
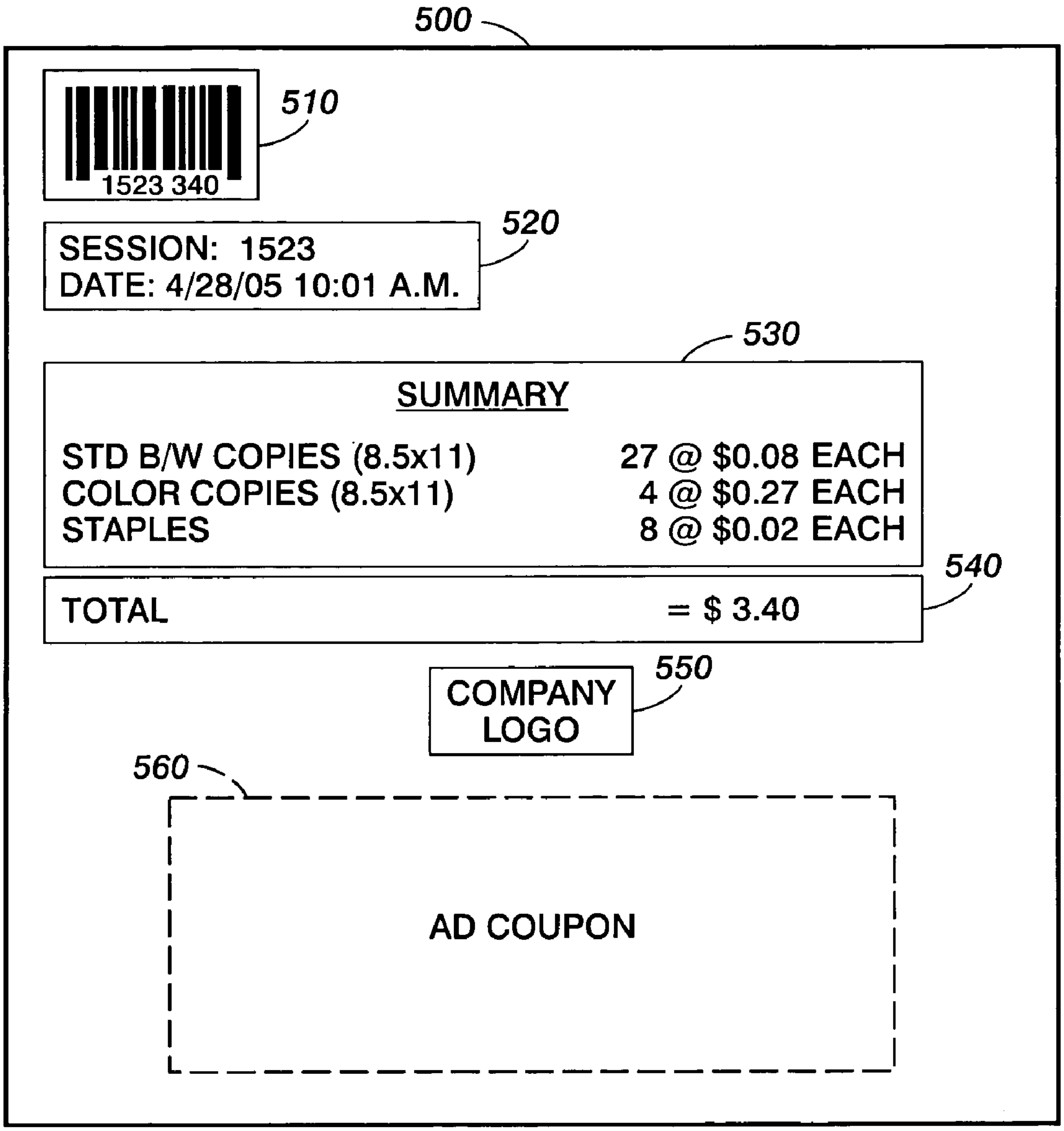
FIG. 5 illustrates another exemplary pay-for-use session activity report.

FIG. 5 shows an alternative session activity report 500 that further includes pricing information in addition to machine usage information. Alternate report 500 also may include an electronically readable summary in addition to a human readable summary. In particular, report 500 may include a customer readable unique ID session tag 520. A session summary 530 provides a customer readable session summary of machine activity usage information, as in the prior example, but also includes costing information associated with each activity performed. A cost summary 540 may also be provided showing a session total cost. This cost information, as well as session ID tag information, may also be provided on report 500 in electronically readable form, such as shown in section 510 in the form of an exemplary bar code. As in the prior report example, various additional information may be provided on the report, such as company logo 550 or ad coupon 560.

As mentioned previously, functionality besides copying can be monitored and captured on the machine activity report. Depending on the functionality of the machine, other charge-for-service functions such as scanning, faxing, e-mailing, scan-to-e-mail, or scan-to-X functionality can be monitored and appropriately billed.

By integrating monitoring and account reporting into the machine itself, a simple system for accurately monitoring, accounting for and billing of pay-for-use services can be achieved without the need for external monitoring or actuation devices. This allows for more complete and accurate billing, which increases profitability. Moreover, such reports can be used by the service provider to keep accurate records of machine usage, profitability, etc. to increase revenues from the machines. Also, by providing billing reports to the customer in a complete and accurate form, a simplified payment transaction can occur at a standard POS terminal or cashier.

It will be appreciated that various of the above-disclosed and other features and functions, or alternatives, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A pay-for-use office machine, comprising:

a print engine;

a user interface that receives customer input requests for pay-for-use services;

a unique session ID generator that assigns a unique session ID to each pay-for-use customer session;

a memory;

an activity logger that monitors and logs all machine activities associated with a usage charge during each session in the memory; and an automatic session activity report generator that, upon completion of a pay-for-use session, automatically generates and outputs a hardcopy usage and billing session activity report for the session based on the logged machine activities for the session, the hardcopy usage and billing session activity report including the unique session ID and a computed total usage charge for the session, at least a portion of the hardcopy usage and billing session activity report being electronically readable by a point of sale terminal to enable point of sale customer billing for the session.

2. The pay-for-use office machine according to claim 1, wherein the machine activities include at least one activity selected from the group of printing, scanning, copying, faxing and e-mailing functions.

3. The pay-for-use office machine according to claim 2, wherein the machine activities include a finishing function.

4. The pay-for-use office machine according to claim 3, wherein the finishing function includes at least one activity from the group of binding, stapling, collating, and providing a cover sheet.

5. The pay-for-use office machine according to claim 1, further comprising a database containing a pricing scheme for machine activities associated with a usage charge.

6. A pay-for-use office system, comprising:

a pay-for-use office machine including a print engine;

a user interface that receives customer input requests for pay-for-use services;

a unique session ID generator that assigns a unique session ID to each pay-for-use customer session;

a memory;

an activity logger that monitors and logs all machine activities associated with a usage charge during each session in the memory; and an automatic report generator that, upon completion of a pay-for-use session, automatically generates and outputs a hardcopy usage and billing session activity report for the session based on the logged machine activities for the session, the hardcopy usage and billing session activity report including the unique session ID and a computed total usage charge for the session, at least a portion of the hardcopy usage and billing session activity report being electronically readable by a point of sale terminal to enable point of sale customer billing for the session;

a point of sale terminal associated with the pay-for-use office machine; and wherein the hardcopy usage and billing session activity report is readable at the point of sale terminal to enable point of sale customer billing for the session at the point of sale terminal.

7. The pay-for-use office system according to claim 6, wherein the machine activities include at least one activity selected from the group of printing, scanning, copying, faxing and e-mailing functions.

8. The pay-for-use office system according to claim 6, wherein the machine activities include a finishing function.

9. The pay-for-use office system according to claim 8, wherein the finishing function includes at least one activity from the group of binding, stapling, collating, and providing a cover sheet.

10. The pay-for-use office system according to claim 6, further comprising a database containing a pricing scheme for machine activities associated with a usage charge.

11. A method for using a pay-for-use office machine, comprising:

setting a pay-for-use office machine in a session-based customer accounting mode;

starting a customer session;

setting a unique customer session ID that identifies the customer session;

enabling office machine operation;

logging chargeable machine activities within the office machine during a dynamically changeable session length;

signaling customer session completion;

automatically generating and outputting a hardcopy usage and billing session activity report for the customer session using the office machine, the hardcopy usage and billing session activity report including the unique customer session ID and a computed total usage charge for the customer session;

electronically reading at least a portion of the hardcopy usage and billing session activity report by a point of sale terminal; and billing the customer at a point of sale for the customer session based on information read from the hardcopy usage and billing session activity report and cost information associated with each chargeable machine activity identified on the hardcopy usage and billing session activity report read by the point of sale terminal.

12. The method according to claim 11, wherein the session activity report includes cost information associated with the machine activity information.

* * * * *